United States Patent
Slawson et al.

(10) Patent No.: US 6,804,078 B2
(45) Date of Patent: Oct. 12, 2004

(54) APPARATUS AND METHOD TO EXPEDITE DATA ACCESS FROM A PORTABLE DATA STORAGE CARTRIDGE

(75) Inventors: Staley Bert Slawson, Tucson, AZ (US); Raymond Yardy, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 487 days.

(21) Appl. No.: 09/908,952

(22) Filed: Jul. 19, 2001

(65) Prior Publication Data

US 2003/0016464 A1 Jan. 23, 2003

(51) Int. Cl.[7] .............................................. G11B 17/00
(52) U.S. Cl. .................. 360/69; 369/34.1; 369/178.01
(58) Field of Search ............................. 360/69, 71, 132, 360/92; 340/572.8; 700/214, 213; 369/30.38, 30.39, 30.4, 30.41, 30.42, 30.43, 30.45, 47.1, 52.1, 75.1, 76, 33.01, 34.01, 178.01

(56) References Cited

U.S. PATENT DOCUMENTS

| | | | |
|---|---|---|---|
| 5,199,084 A | 3/1993 | Kishi et al. .................... 382/48 |
| 5,345,350 A | 9/1994 | Ellis et al. ..................... 360/92 |
| 5,357,495 A | 10/1994 | Solhjell ........................ 369/34 |
| 5,388,946 A | 2/1995 | Bauer .......................... 414/281 |
| 5,412,791 A | 5/1995 | Martin et al. ................. 395/425 |
| 5,426,581 A | 6/1995 | Kishi et al. ............. 364/167.01 |
| 5,450,385 A | 9/1995 | Ellis et al. ..................... 369/34 |
| 5,479,581 A | 12/1995 | Kleinschnitz ................. 395/82 |
| 5,504,873 A | 4/1996 | Martin et al. ................. 395/438 |
| 5,537,268 A | 7/1996 | Felde et al. .................... 360/92 |
| 5,588,796 A | 12/1996 | Ricco et al. ................. 414/741 |
| 5,601,391 A | 2/1997 | Gazza ......................... 414/280 |
| 5,606,467 A | 2/1997 | Hirata .......................... 360/69 |
| 5,634,032 A | 5/1997 | Haddock ..................... 395/439 |
| 5,638,347 A | 6/1997 | Baca et al. .................... 369/34 |
| 5,656,918 A | 8/1997 | Pearman et al. ............... 369/34 |
| 5,703,843 A | 12/1997 | Katsuyama et al. ........... 369/34 |
| 5,708,545 A | 1/1998 | Goken et al. ................ 360/132 |
| 5,729,464 A | 3/1998 | Dimitri ................... 364/478.03 |
| 5,760,995 A | 6/1998 | Heller et al. ................... 360/92 |
| 5,774,431 A | 6/1998 | Bos et al. ...................... 369/30 |
| 5,809,511 A | 9/1998 | Peake ......................... 707/204 |
| 5,818,723 A | 10/1998 | Dimitri ................... 364/478.02 |
| 5,819,309 A | 10/1998 | Gray ........................... 711/111 |
| 6,201,474 B1 * | 3/2001 | Brady et al. .............. 340/572.8 |
| 6,421,196 B1 * | 7/2002 | Takayama et al. ............. 360/71 |

* cited by examiner

Primary Examiner—Andrew L. Sniezek
(74) Attorney, Agent, or Firm—Dale F. Regelman

(57) ABSTRACT

An apparatus and method are disclosed to read from a portable data storage cartridge data position information, and to communicate that data position information to a data drive unit during transport of the cartridge to that data drive unit.

24 Claims, 10 Drawing Sheets

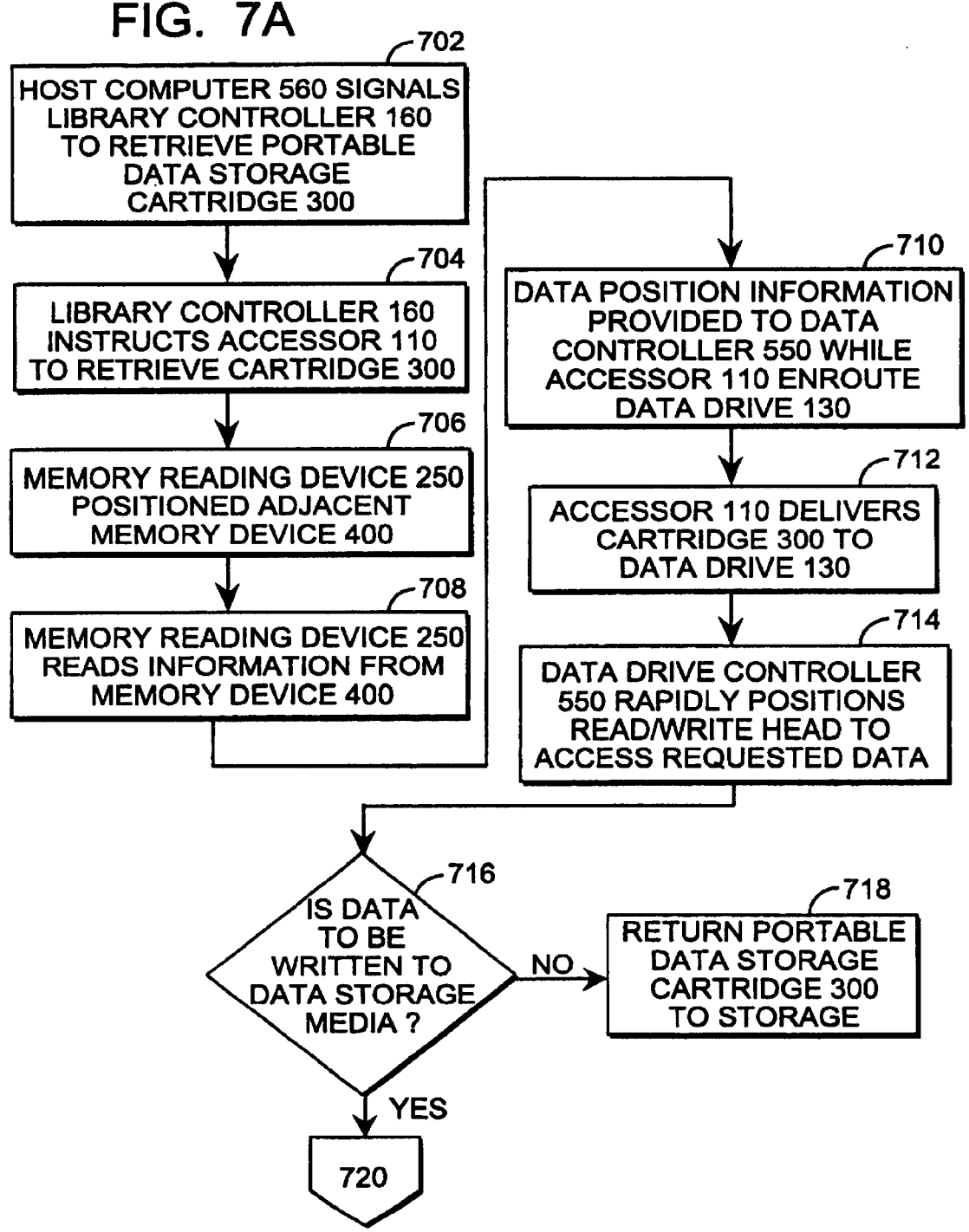

APPARATUS AND METHOD TO EXPEDITE DATA ACCESS FROM A PORTABLE DATA STORAGE CARTRIDGE

FIELD OF THE INVENTION

The present invention relates generally to a data storage and retrieval system, and in particular to a data storage and retrieval system utilizing portable data storage cartridges, each of which includes data position information stored within a memory device, in combination with memory reading devices disposed on one or more accessors movably disposed within that data storage and retrieval system. The present invention further relates to a method to communicate such position information relating to a specified portable data storage cartridge to a data drive in advance of the arrival of that specified portable data storage cartridge to expedite data acquisition from that specified portable data storage cartridge.

BACKGROUND OF THE INVENTION

The need to store and retrieve large volumes of digital data has resulted in the need for data storage devices having ever increasing amounts of storage capacity. Data can be stored, of course, in cassettes, floppy disks, diskettes, hard disks, optical disks, capacitative disks and the like. However, the greater the amount of memory available, the more difficult it becomes to accurately obtain specified data with rapid access times and with maximum system fault tolerance.

Automated data storage and retrieval systems, more commonly known as libraries, jukeboxes or auto changers (collectively referred to herein as "libraries"), are frequently used when there is a need to keep relatively large amounts of data available at a cost per gigabyte which is lower than that of solid state memory or hard files. Libraries are available for optical disks, optical tape and magnetic tape media. The optical disks can be, for example, rewritable magneto-optical, rewritable phase change, write-once (WORM), standard CD-ROM, recordable CD-ROM, erasable CD-ROM or high density CD-ROM. Magnetic tape, optical tape, and optical disks (one or more), are often disposed within a rigid protective housing comprising a cassette or a cartridge. Some libraries store and transport "magazines" containing several media-containing cartridges. As used herein, unless otherwise specified, the term "media" will refer to any data storage media by itself, and the term "cartridge" will refer to any portable data storage device having a data storage media internally disposed therein.

Prior art systems sometimes utilize a plurality of data storage media in conjunction with one or more robotic accessors to retrieve stored cassettes and place them in data drive unit. For example, portable data storage cartridges are transported from a storage area to a data drive mechanism which reads and/or records data for utilization by a host computer from and/or to the data storage media disposed within those cartridges. After the data drive unit, and its associated drive controller, have completed use of the data storage media, the portable data storage cartridge is returned to its storage area. The time expended to transport the cartridge from the storage area to the data drive mechanism is lost in prior art system because the cartridge is transported with very little, if any, retrieval of the data position information from the media disposed in the cassette.

A typical library contains one or more banks, columns, or walls of storage cells, one or more data drive units, and one or more accessors to transport specified portable data storage cartridges between those storage cells and data drives. Each accessor generally includes a hand-like gripper mechanism to remove and/or insert the portable data storage cartridges to and from a storage cell, and to and from a data drive unit. The library may also include an input/output station through which an operator can insert or withdraw data units into and from the interior of the library.

The components of a library are coupled to and controlled by a library controller which in turn is coupled to a host computer. Data requests are exchanged between the host computer and the library controller, and between the library controller and the other components of the library system. Data written on, or retrieved from, storage media disposed in portable cassettes is exchanged between the host computer and the drive controller.

In many prior art libraries, the cassettes (cartridges) have a machine readable label on a front facing edge which is visible when the cartridge is in a storage cell. A reader, such as a vision system or bar code scanner is mounted on the accessor. The reader senses the label to verify that a particular cartridge is the cartridge which has been specified. Such a system is shown in U.S. Pat. No. 5,729,464, issued on Mar. 17, 1998 to K. E. Dimitri, entitled "Media Identification In An Automated Data Library," and assigned to the assignee of the present invention. Only a very limited amount of data, however, can be retrieved from such a label. In addition, that limited information is not changeable unless the entire label is replaced.

What is needed is an apparatus and a method to enable a data storage and retrieval system to obtain data position information from a specified portable data storage cartridge, and to provide that data position information to a data drive unit before arrival of that specified data storage device, i.e. while an accessor is transporting that portable data storage cartridge to the drive.

SUMMARY OF THE INVENTION

Applicants' invention includes a portable data storage cartridge which includes a memory device disposed therein and data position information stored on that memory device. Applicants' invention further includes an accessor for retrieving and transporting Applicants' portable data storage cartridge within a data storage and retrieval system. Applicants' accessor includes one or more gripper mechanisms and a memory reading device disposed thereon such that when one of Applicants' portable data storage cartridges is releaseably attached to any of the gripper mechanisms the accessor's memory reading device is disposed adjacent the cartridge's memory device.

Applicants' invention further includes a method to expedite access to data stored on a data storage media disposed within Applicants' portable data storage cartridge. Applicants' invention further includes a computer useable medium having computer readable program code disposed therein to implement Applicants' method to expedite data retrieval from a portable data storage cartridge.

The foregoing and other features and advantages of the invention will be apparent from the following more particular description of preferred embodiments of the invention, as illustrated in the accompanying drawings.

BRIEF DESCRIPTION OF THE DRAWINGS

FIG. 7A is a flow chart summarizing the initial steps in Applicants' method to expedite access to data stored on data storage media disposed within Applicants' portable data storage cartridges;

DETAILED DESCRIPTION OF PREFERRED EMBODIMENTS

Referring to the illustrations, like numerals correspond to like parts depicted in the figures. The invention will be described as embodied in an automated data storage and retrieval subsystem for use in a data processing environment. Although certain of the embodiments shown use magnetic tape cartridges, one skilled in the art will recognize that the invention equally applies to optical disk cartridges or other removable storage media. Furthermore, the description of a data storage and retrieval system is not meant to limit Applicants' invention to only data processing applications, as the invention herein can be applied to portable data storage cartridge handling systems in general.

Figure 1:
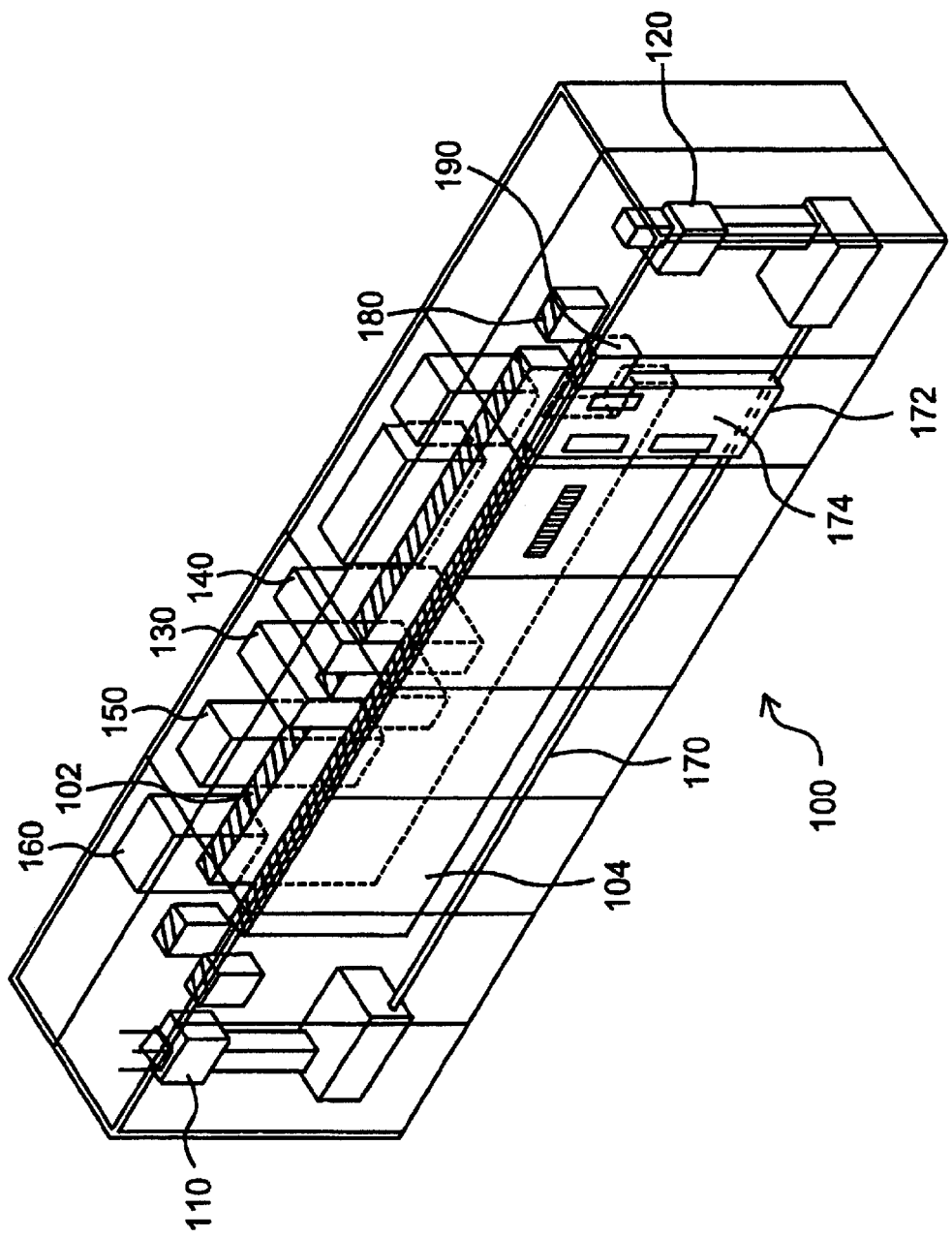
FIG. 1 is a perspective view of one embodiment of Applicants' data storage and retrieval system.

Referring to FIG. 1, Applicants' automated data storage and retrieval system 100 is shown having a first wall of storage slots 102 and a second wall of storage slots 104. Portable data storage cartridges are individually stored in these storage slots. Such portable data storage cartridges comprise a data storage media disposed within a portable container, i.e. a cartridge. Examples of such data storage media include magnetic tapes, optical disks of various types, including ROM, WORM, and rewritable, and the like.

Applicants' automated data storage and retrieval system includes one or more accessors, such as accessors 110 and 120. An accessor is a robotic device which accesses portable data storage media from first storage wall 102 or second storage wall 104, delivers that accessed media to data storage drives 130/140 for reading and/or writing data thereon, and returns the media to the proper storage slot.

As shown in FIG. 1, accessors 110 and 120 travel bi-directionally along rail 170 in an aisle disposed between first wall of storage slots 102 and second wall of storage slots 104. Library controller 160 controls the operations of accessors 110/120 and data storage drives 130/140. Library controller 160 includes at least one computing processor. In the embodiment shown in FIG. 1, library controller 160 is disposed within system 100. In alternative embodiments, library controller 160 is located external to system 100. In these remote controller embodiments, library controller 160 communicates with system 100 via a communication link (not shown in FIG. 1).

In certain embodiments, library controller 160 is in communication with host computer 560 (FIGS. 5, 6) from which library controller 160 receives instructions. In certain embodiments, data to be recorded onto, or read from, a selected portable data storage cartridge is communicated between the drive 130/140 and host computer 560 either via library controller 160. In alternative embodiments, data to be recorded onto, or read from, a selected portable data storage cartridge is communicated directly between drive 130/140 and host computer 560.

Operator input station 150 permits an operator to communicate with Applicants' automated data storage and retrieval system 100. Power component 180 and power component 190 each comprise one or more power supply units which supply power to the individual components disposed within Applicants' automated data storage and retrieval system.

Import/export station 172 include access door 174 pivotably attached to the side of system 100. Portable data storage cartridges can be placed in the system, or in the alternative, removed from the system, via station 172/access door 174.

Figure 2:
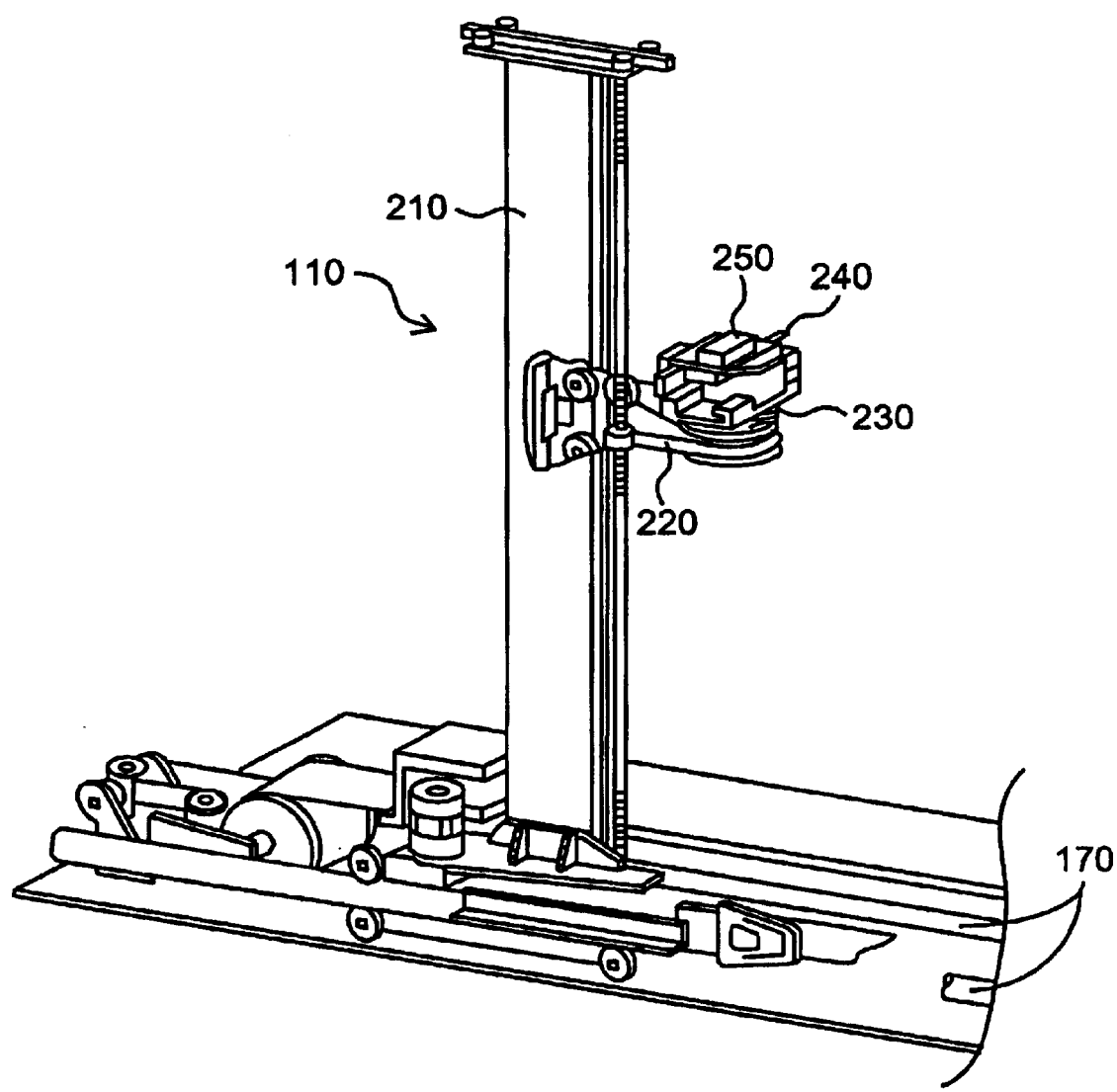
FIG. 2 is a perspective illustration of Applicants' robotic accessor moveably disposed within Applicants' data storage and retrieval system.

Referring to FIG. 2, accessor 110 travels bi-directionally along rail system 170. In the embodiment shown in FIG. 2, rail system 170 comprises two parallel rails. Accessor 110 includes vertical pillar 210. Lifting servo section 220 moves vertically along pillar 210. Accessor 110 includes first gripper mechanism 230, second gripper mechanism 240, and memory reading device 250.

Figure 3A:
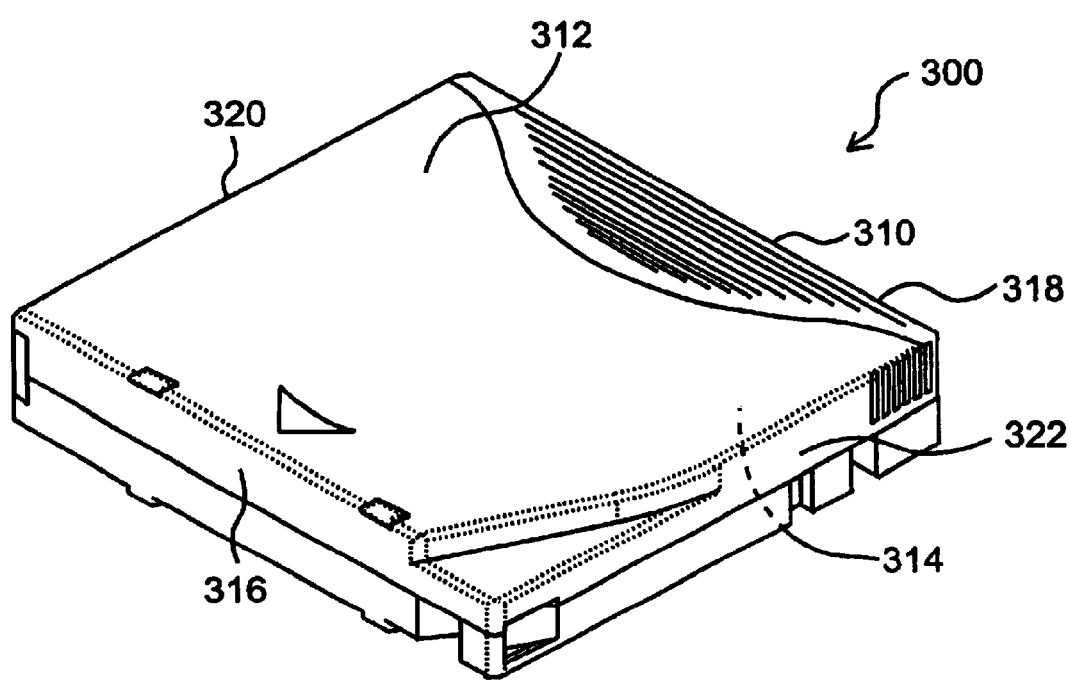
FIG. 3A is a perspective view of a tape cartridge constructed in accordance with a preferred embodiment of the present invention particularly illustrating the arrangement of respective components in the cartridge.
Figure 3B:
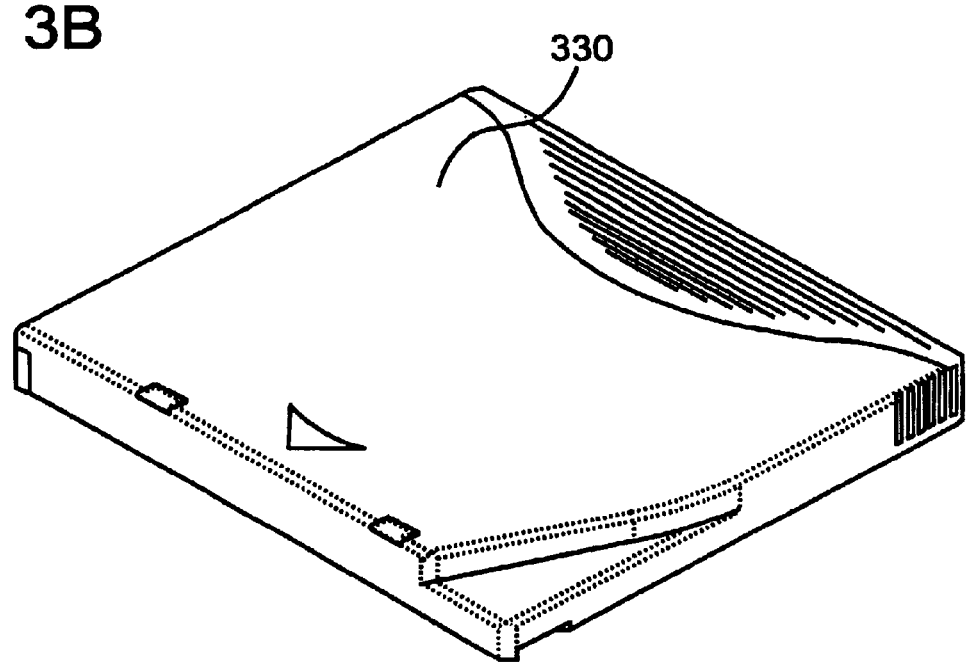
FIG. 3B shows the top half of Applicants' portable data storage cartridge.
Figure 3C:
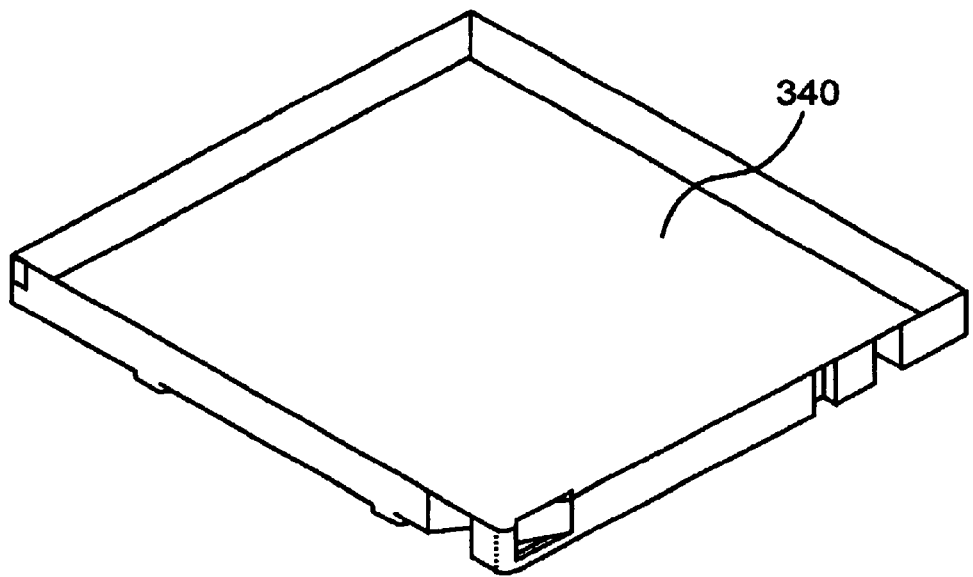
FIG. 3C shows the bottom half of Applicants' portable data storage cartridge.

In accord with Applicants' invention, one or more portable data storage cartridges disposed within system 100 includes memory device 400 (FIG. 4) containing data position information. This data position information is somewhat akin to a file allocation table ("FAT") sometimes used on computer disks, where that FAT contains information regarding the location of data on those disks. Similarly, the data position information stored in the memory device 400 comprises information regarding the location of data stored on data storage media 350 (not shown in FIGS.) internally disposed within cartridge 300 (FIG. 3). Cartridge 300 is shown in greater detail in FIGS. 3A, 3B, and 3C.

Referring now to FIG. 3A, cartridge 300 is shown comprising housing 310. Housing 310 includes top surface 312, bottom surface 314, first side 316 and opposing second side 318, third side 320 and opposing fourth side 322. Data storage media 350 (not shown in FIG. 3) is internally disposed within housing 310. There are various features not shown on housing 310, such as locating notches, write-inhibiting switches, and the like, which are not relevant to the present invention. It is apparent to those skilled in the art that tape cartridge 300 is only exemplary and the present invention is applicable to any configuration of tape cartridge 300.

Referring to FIGS. 3B and 3C, housing 310 can be formed from top half 330 and bottom half 340. Top half 330 and bottom half 340 can be formed by, for example, casting, molding, stamping, or milling any rigid material, including metal, plastic, and combinations thereof. In the alternative, housing 310 can be formed from individual components 312, 314, 316, 318, 320, and 322, wherein those individual components are formed using the methods recited above, and joined using conventional techniques such as welding, adhesive bonding, mechanical attachment, including screws, nuts, bolts, and the like. In one embodiment, housing 310 is formed by injection molding top half 330 and bottom half 340, inserting data storage media 350 and memory device 400 into bottom half 340, and then joining top half 330 to bottom half 340.

In one embodiment of Applicants' invention, data storage media 350 comprises a single reel tape (not shown in FIGS. 3A, 3B, 3C) for an automatic threading tape drive. The reel includes layers of magnetic tape with a leader block attached to the free end of the tape. This leader block is held in a receiving well disposed on one corner of the cartridge when the cartridge is out of the tape drive. The leader block connects with a threading pin in the threading tape drive (not shown) for threading the tape through the drive to a take-up reel hub. The leader block includes a conforming section that fits the leader block into a channel of the tape drive. U.S. Pat. No. 4,426,047, issued on Jan. 17, 1984, and assigned to the assignee of the present invention, includes a more complete description of such tape cartridge with a leader block and a tape drive, and is hereby incorporated by reference.

Figure 4:
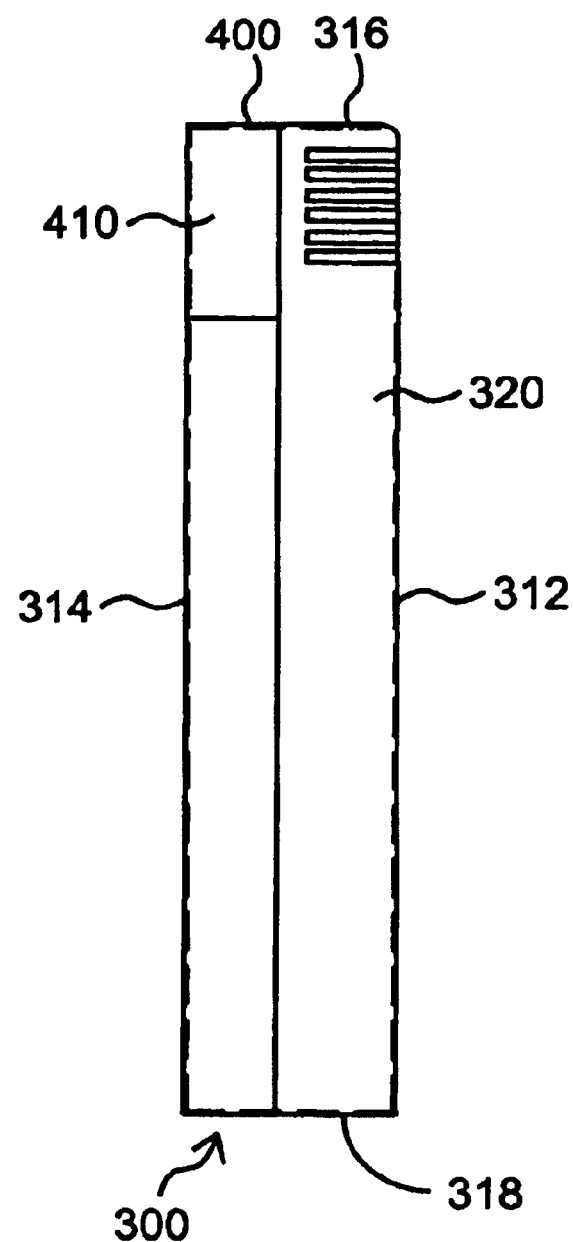
FIG. 4 is a plan view of the corner of Applicants' cartridge of FIG. 3A, including the memory storage device of the present invention.

FIG. 4 shows memory device 400 disposed within side 320 of cartridge 300. In the embodiment shown in FIG. 4, memory device 400 is internally disposed within housing 310 such that side 410 of memory device 400 is flush with side 320 of cartridge 300. Memory device 400 is disposed within housing 310 such that memory device 400 can communicate with memory reading device 250 (FIG. 2) disposed on accessors 110/120 (FIG. 1). In certain embodiments, memory device 400 comprises a non-volatile memory device. In certain embodiments of Applicants' invention, memory device 400 comprises a non-volatile, semiconductor memory device.

Memory device 400 need store only a limited amount of data, that is, data sufficient for library controller 160 (FIG. 1) to ascertain the location of certain requested data on data storage media 350. In one embodiment, memory device 400 includes Dallas semiconductor DE PROM DS2433. This memory is an electrically erasable and programmable read only memory. In an alternate embodiment, memory device includes a semiconductor memory sold in commerce under the trademark INTRL Strata Flash.

Figure 5:
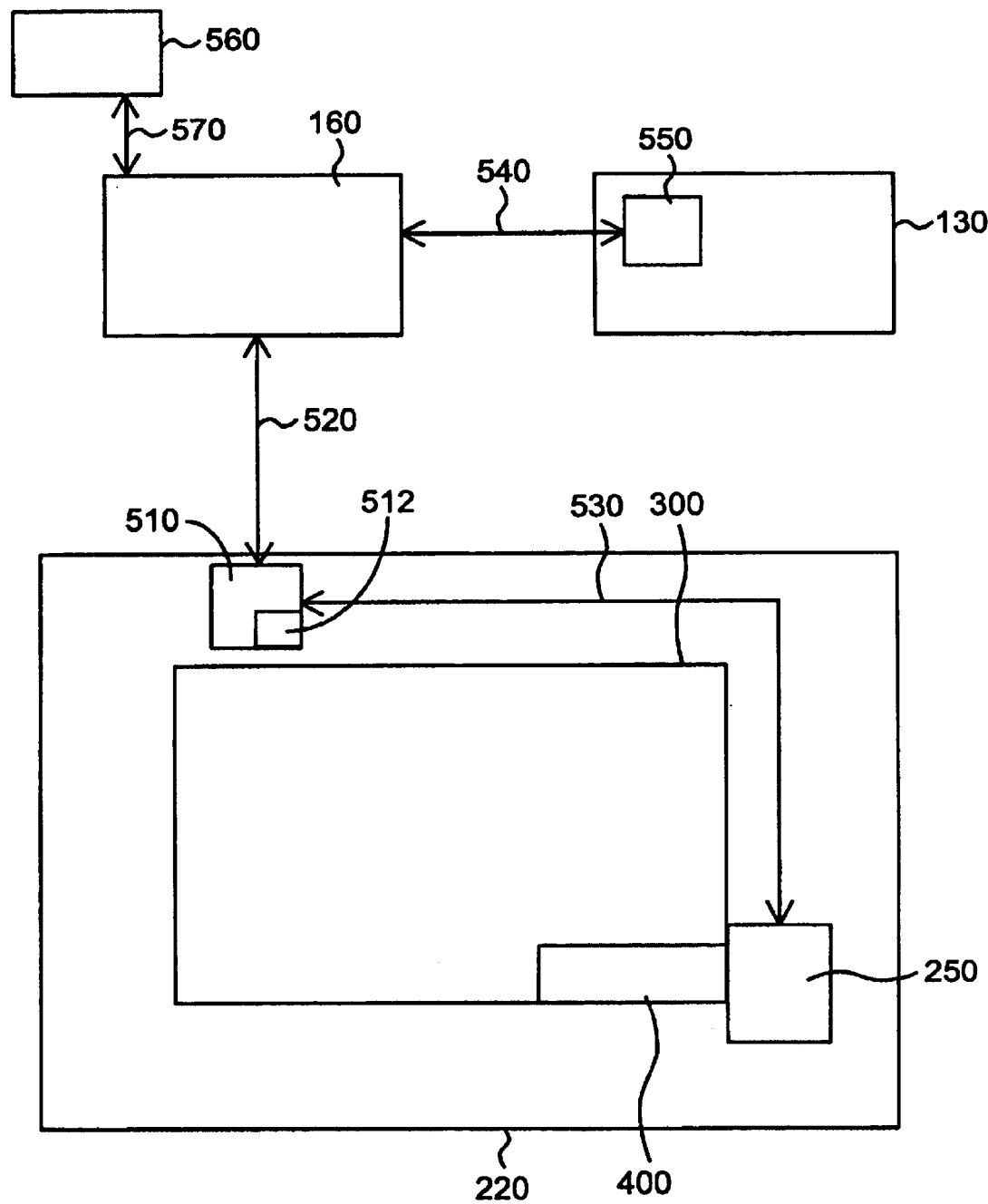
FIG. 5 is a block diagram depicting the components of one embodiment of Applicants' data storage and retrieval system.

FIG. 5 comprises a schematic illustrating, among other things, lifting servo section 220 (FIG. 2) and the positions of memory reading device 250 (FIG. 2) and memory device 400 (FIG. 4) when cartridge 300 (FIG. 3) is removeably attached to either gripper mechanism 230 (FIG. 2) or gripper mechanism 240 (FIG. 2). As shown in FIG. 5, when portable data storage cartridge 300 is removeably attached to either gripper mechanism 230 or 240, memory device 400 is disposed adjacent memory reading device 250, such that memory reading device 250 can read the information stored in memory device 400. In one embodiment, memory device 400 includes one or more input/output terminals 412 (not shown in FIG. 4) disposed on side 410 (FIG. 3). In this embodiment, memory reading device 250 releaseably connects to those input/output terminals thereby allowing the transfer of information. U.S. Pat. No. 5,606,467 describes such an interconnection between input/output terminals connected to a memory device and a memory reading device, and is hereby incorporated by reference.

In alternative embodiments, information is passed from memory device 400 to memory reading device 250 using a contactless interface. In certain embodiments, such a contactless interface comprises a contactless radio frequency interface. In certain embodiments, this radio frequency interface provides power to memory device 400, and provides read/write access to memory device 400. In these embodiments, memory device 400 comprises an EEPROM containing 4,096 bytes organized as 128 32-byte accessible blocks. In these embodiments, reading device 250 generates an operating field. This operating field supplies power to memory device 400, and is modulated by both memory device 400 and memory reading device 250 to enable contactless communication between device 250 and device 400.

In one embodiment, the operating field has a frequency of about 13,560 kHz±7 kHz. The minimum field strength is about 5 A/m and the maximum field strength is about 15 A/m. Memory reading device 250 communicates with memory device 400 by amplitude modulating this operating field. Memory device 400 communicates with memory reading device 250 by load modulating the operating field with a subcarrier having a subcarrier frequency equal to about fc/16. As those skilled in the art will appreciate, load modulation is the process of amplitude modulating a radio frequency field by varying the properties of a resonant circuit placed within the radio frequency field.

Figure 8:
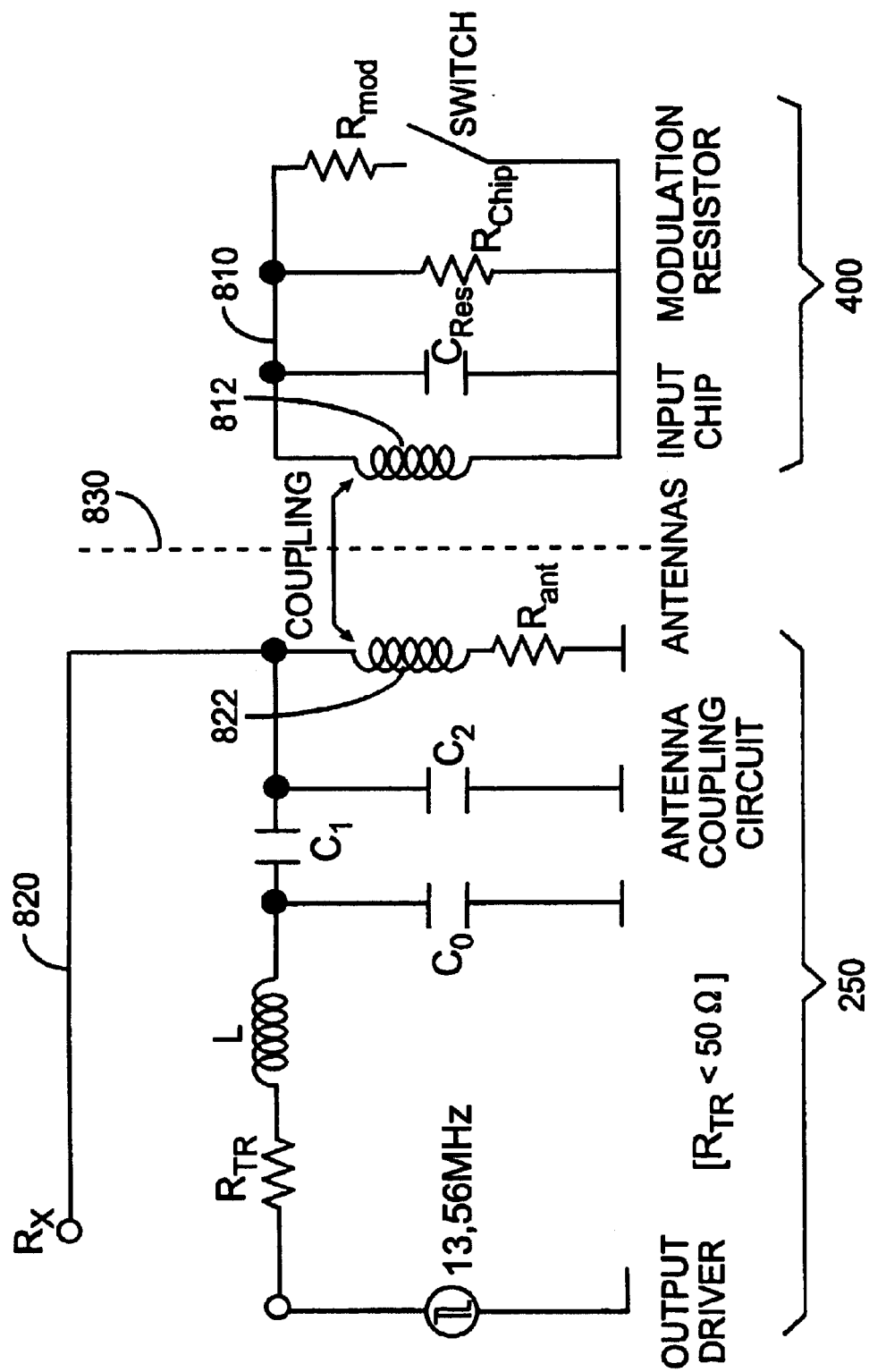
FIG. 8 is a schematic illustrating a contactless interface between a memory device and a memory reading device.

Referring to FIG. 8, in one embodiment memory device 400 includes circuit 810. Memory reading device 250 includes circuit 820. A resistive load is switched in coil 812. Coil 812 is inductively coupled to coil 822 across contactless interface 830. Coil 822 generates a radio frequency field at the operating frequency of about 13.56 MHz. The switching amplitude of coil 812 modulates the radio frequency field in coil 822 with a signal, for example, having a frequency of about fc/16, thereby allowing memory device 400 to communicate information to memory reading device 250 across contactless interface 830.

In the embodiment shown in FIG. 5, accessor control card 510 is disposed on lifting servo section 220. In certain embodiments, accessor control card 510 includes memory 512. Communication link 520 connects the accessor control card 510 and library controller 160. Communication link 530 connects memory reading device 250 and accessor control card 510. Communication link 570 connects library controller 160 and host computer 560.

Data drive 130 (FIG. 1) includes data drive controller 550. Communication link 540 connects library controller 160 and data drive controller 550. Data drive 130 includes a read/write head 560 (not shown in FIG. 5) to read data from, and write data to, data storage media 350 resident in a portable data storage cartridge 300 (FIG. 3) when cartridge 300 is disposed in data drive 130.

In certain embodiments, communication links 520, 530, and 540 comprise an ethernet protocol bus or a CANbus protocol bus. Those skilled in the art will appreciate that CANbus technology was developed in the automotive industry, but now has gained wide acceptance in other industries. In these CANbus embodiments, communication links 520, 530, and 540 include 1 Mbit/s transmissions up to 40 meter bus length and 5 Kbit/s transmissions up to 1000 meter bus length.

In certain embodiments, communication link 570 is selected from the group comprising a serial interface, such as an RS-232 cable or an RS-422 cable, a SCSI interface, a Fibre Channel interface, a local area network, a private wide area network, a public wide area network, and combinations thereof.

Gripper mechanisms 230/240 (FIG. 2) position cartridge 300 (FIG. 3) such that memory device 400 is disposed adjacent memory reading device 250 (FIG. 2). Memory reading device 250 reads the data position information stored in memory device 400, and provides that data position information to library controller 160 via communication link 530, accessor control card 510, and communication link 520. Library controller 160 then compares that data position information with the requested data in order to determine the location of that requested data on storage media 350 disposed within the portable data storage cartridge 300. Library controller 160 in turn provides drive controller 550 with exact position information regarding the location of the requested data on data storage media 350.

With respect to a tape media, after cartridge 300 has been delivered to, and placed in, data drive 130, drive controller 550 utilizes the exact position information to cause data drive 130 to rapidly advance the tape media with respect to read/write head 560 such that the requested data is quickly available to library controller 160 and host computer 560. After data retrieval is completed, and in the event no new data is written to data storage media 350, library controller 160 instructs accessor 110 (FIG. 1) to remove cartridge 300 (FIG. 3) from data drive 130 (FIG. 1), and to return portable data storage cartridge 300 to its storage slot in first storage wall 102 (FIG. 1) or second storage wall 104 (FIG. 1).

Alternatively, if the location of existing data has been changed, or if new data is written to data storage media 350, the data position information stored in memory device 400 must be updated. In certain embodiments, drive 130 can communicate with memory device 400. In these embodiments, library controller 160 instructs drive 130, via drive controller 550, to update the data position information stored in memory device 400.

In alternative embodiments, drive controller 550 provides library controller 160 with updated data position information. Library controller 160 then communicates this updated information to memory reading device 250 and causes memory reading device 250 to communicate this updated information to memory device 150 for storage therein.

Thus, the data position information resident in memory device 400 remains updated with respect to the position of all the data stored on data storage media 350. In certain embodiments of Applicants' invention, data drive controller 550 or library controller 160 causes data drive 130 or memory reading device 250, respectively, to overwrite the initial data position information with the updated data position information.

Figure 6:
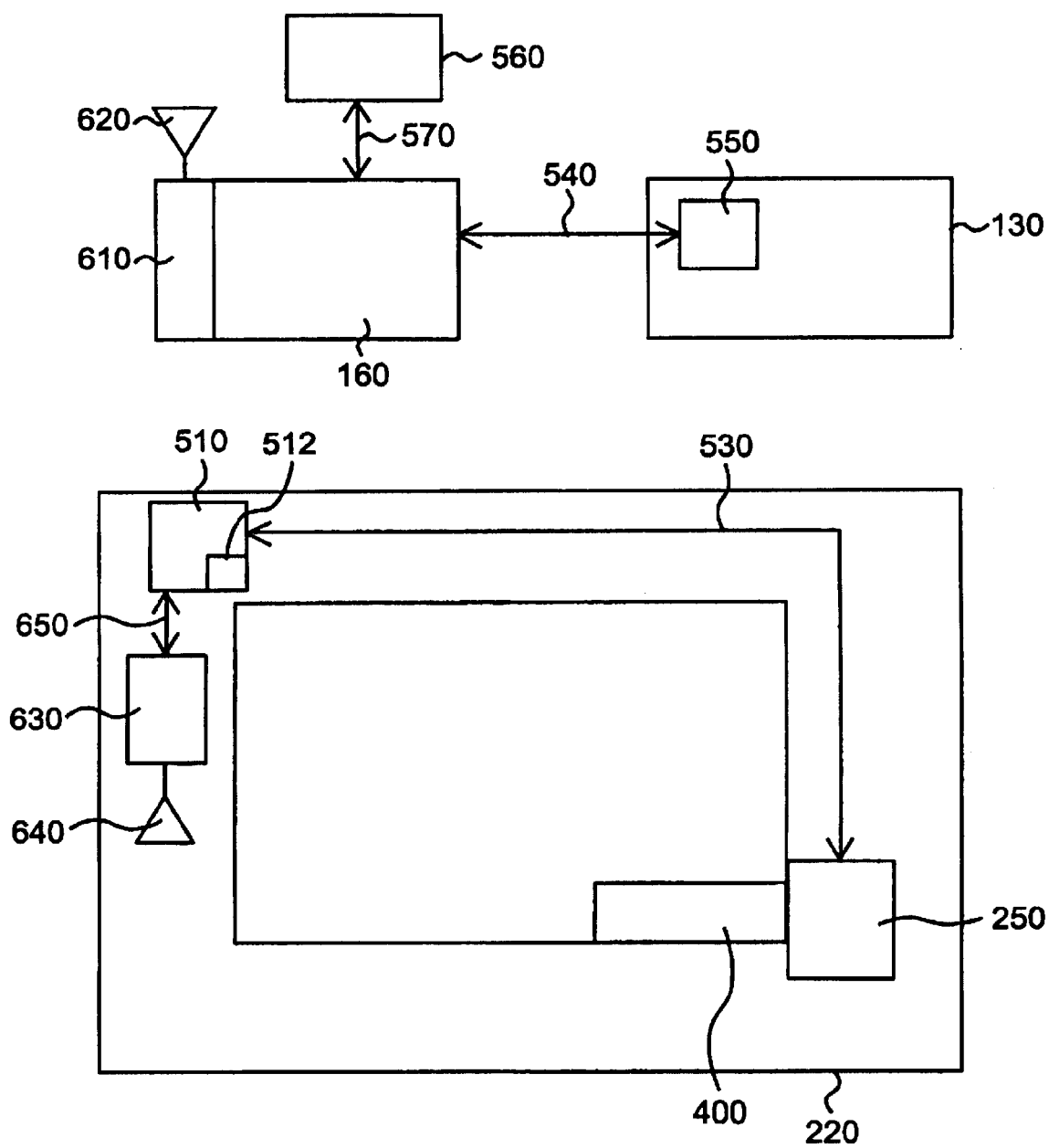
FIG. 6 is a block diagram depicting the components of a second embodiment of Applicants' data storage and retrieval system.

FIG. 6 shows an alternative embodiment wherein library controller 160 includes wireless communication device 610. In the embodiment shown in FIG. 6, wireless communication device 610 includes antenna 620. In alternate embodiments, wireless communication device 610 does not include antenna 620.

Wireless communication device 630 is disposed on lifting servo section 220 and is connected to accessor control card 510 via communication link 650. In certain embodiments, communication link 650 comprises an ethernet protocol bus and/or a CANbus protocol bus. In the embodiment shown in FIG. 6, communication device 630 includes antenna 640. In alternate embodiments, wireless communication device 630 does not include antenna 640.

In Applicants' wireless communication embodiments, accessor 110, including memory reading device 250, communicates with library controller 160 by wireless communication. Wireless communication in these embodiments is conducted using emissions in the infrared spectrum, visible spectrum, and/or frequencies between about 10 MHz to about 10 GHz.

FIG. 7A is a flowchart summarizing the initial steps in Applicants' method to expedite data retrieval from portable data storage cartridge 300 (FIG. 3). In step 702, host computer 560 (FIGS. 5, 6) signals the library controller 160 (FIGS. 1, 5, 6) to retrieve portable data storage cartridge 300 (FIG. 3) from its storage slot disposed in either first storage wall 102 (FIG. 1) or second storage wall 104 (FIG. 1). In step 704, library controller 160 dispatches accessor 110 (FIGS. 1, 2), via accessor control card 510 (FIGS. 5, 6), to retrieve cartridge 300.

In step 706, gripper mechanism 230 (FIG. 2) or gripper mechanism 240 (FIG. 3) holds the cartridge 300 such that memory device 400 (FIG. 4) is disposed adjacent memory reading device 250 (FIG. 2). In step 708, memory reading device 250 reads the data position information stored in memory device 400. In certain embodiments, this data position information is stored in memory 512 (FIGS. 5, 6) disposed on accessor control card 510 (FIGS. 5, 6). In step 710 memory reading device 250 provides the downloaded data position information to data drive controller 550 via communication links 520/530/540, accessor control card 510, and library controller 160. Thus, the data position information downloaded from memory device 400 is provided to data drive controller 550 while accessor 110 is still enroute data drive 130 with portable data storage cartridge 300.

In step 712, accessor 110 delivers the portable data storage cartridge 300 to data drive 130. Cartridge 300 is inserted into data drive 130, and in step 714 data drive controller 550 instructs data drive 130 to quickly advance data storage media 350 such that read/write head 560 is positioned to retrieve the requested data from data storage media 350. Read/write head 560 then reads the requested data from data storage media 350 and communicates that data to host computer 560 (FIGS. 5, 6) via data drive controller 550 (FIGS. 5, 6), library controller 160, communication links 540/570 (FIGS. 5, 6). In the event no new data is written to data storage media 350, then in step 718 cartridge 300 is removed from data drive 130 and is returned to storage.

Figure 7B:
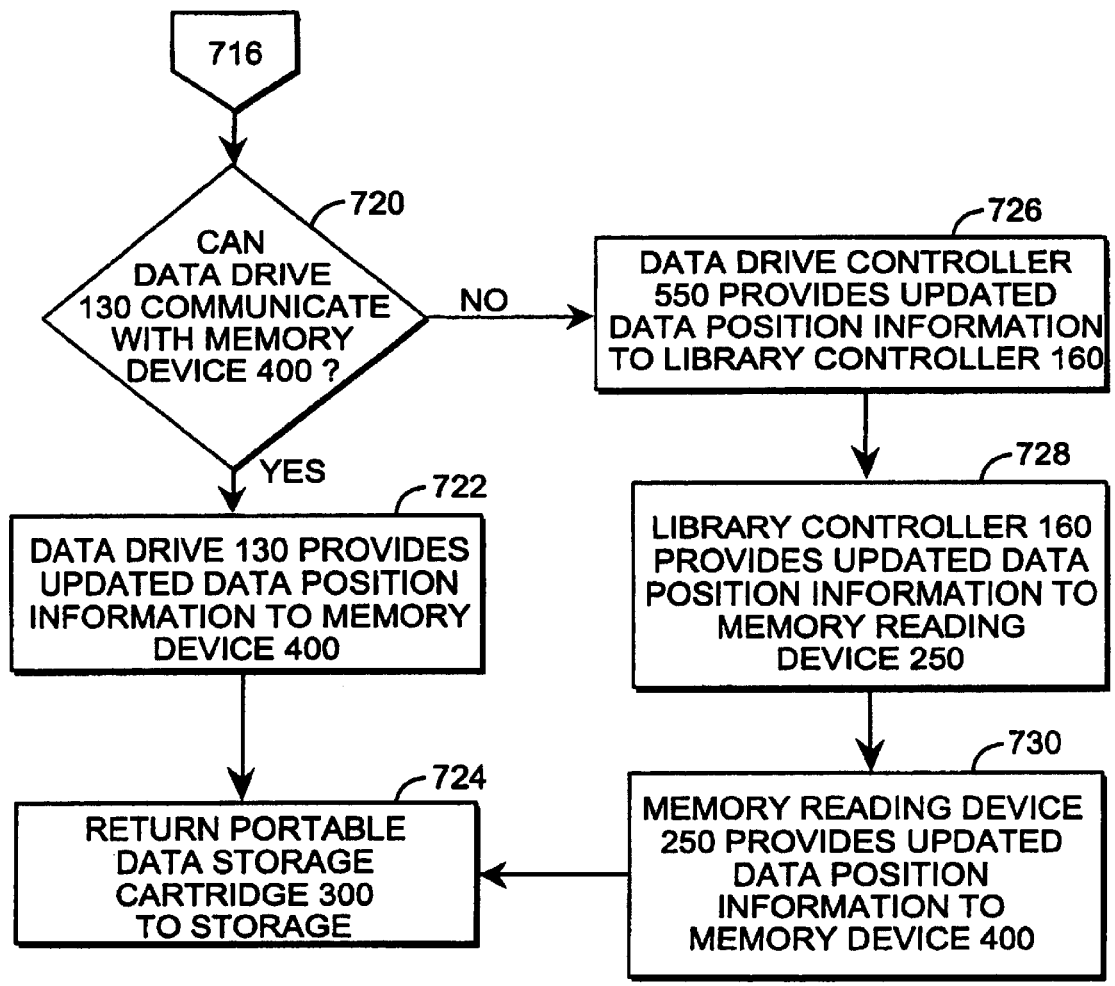
FIG. 7B is a flow chart summarizing additional steps in Applicants' method to expedite access to data stored on data storage media disposed within Applicants' portable data storage cartridges.

Referring now to FIG. 7B, in the event data is written to the data storage media 350, and in the event data drive 130 can communicate with memory device 250, then in step 722 data drive 130 provides updated data position information to memory device 400 for storage therein. In the event data drive 130 cannot communicate with memory device 400, then accessor 110 retrieves cartridge 300 from data drive 130. In step 726 data drive controller 550 provides updated data position information to library controller 160. In step 728, library controller 160 provides that updated data position information to memory reading device 250. In step 730 memory reading device 250 provides the updated data storage information to memory device 400 for storage therein. Thereafter, portable data storage cartridge 300 is returned to storage within data storage and retrieval system 100.

Applicants' automated data storage and retrieval system includes a computer useable medium having computer readable program code disposed therein to implement Applicants' method to expedite data retrieval from a portable data storage cartridge. The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims. For example, there will be immediately obvious to those skilled in the art, many modifications of structure, arrangement, proportions, elements, materials and components used in the practice of the invention. For instance, there are other types of cartridges and cassettes that could be used with the invention such as, reel-reel cartridges. Also the invention should not be limited to magnetic tapes and drives. It should be obvious that other storage media, including optical media, is equally adaptable to this invention. The appended claims are, therefore, intended to cover and embrace any such modifications, within the true spirit and scope of the invention.

We claim:

1. An accessor for retrieving and transporting portable data storage cartridges within a data storage and retrieval system, said data storage and retrieval system comprising one or more portable data storage cartridges comprising a memory device containing data position information, one or more data storage drives for receiving said one or more portable data storage cartridges and reading and/or writing data thereon, and a library controller in communication with said one or more data storage drives, comprising:

an accessor control card in communication with said library controller;

a gripper mechanism;

a memory reading device;

a first communication link connecting said memory reading device and said accessor control card;

a wireless communication device;

a second communication link, wherein said second communication link connects said wireless communication device to said accessor control card;

wherein said memory reading device is disposed on said accessor such that when one of said one or more portable data storage cartridges is releaseably attached to said gripper mechanism said memory reading device is disposed adjacent said memory device disposed on said one of said one or more portable data storage cartridges;

wherein said accessor control card communicates with said library controller by wireless communication.

2. A data storage and retrieval system, comprising:

a portable data storage cartridge comprising a housing, a data storage media disposed within said housing, a memory device disposed within said housing, and data position information stored in said memory device;

an accessor for retrieving and transporting said data storage cartridge, wherein said accessor comprises a gripper mechanism, a memory reading device, an accessor control card, and a wireless communication device;

a first communication link connecting said memory reading device and said accessor control card;

a library controller;

a data storage drive for receiving said portable data storage cartridge and reading and/or writing data thereon, said data storage drive further comprising a data storage drive controller;

a second communication link connecting said data storage drive controller and said library controller; and a third communication link connecting said library controller and said accessor control card wherein said third communication link comprises a wireless communication link;

wherein said memory reading device is disposed on said accessor such that when said portable data storage cartridge is releaseably attached to said gripper mechanism said memory reading device is disposed adjacent said memory device.

3. The data storage and retrieval system of claim 2, wherein said memory device comprises non-volatile memory.

4. The data storage and retrieval system of claim 3, wherein said memory device comprises a semiconductor memory device.

5. The data storage and retrieval system of claim 2, wherein said data storage media comprises a magnetic tape.

6. The data storage and retrieval system of claim 5, further comprising:

a host computer; and a fourth communication link connecting said host computer and said library controller.

7. A method to expedite data retrieval from a portable data storage cartridge, comprising the steps of:

providing a portable data storage cartridge comprising a housing, a data storage medium disposed within said housing, a memory device disposed within and extending through said housing, and first data position information stored in said memory device;

providing an accessor for retrieving and transporting said data storage cartridge, wherein said accessor comprises a gripper mechanism, a memory reading device, an accessor control card, and a wireless communication device;

a first communication link connecting said memory reading device and said accessor control card;

providing a data storage drive comprising a read/write head and a data storage drive controller;

a second communication link connecting said data storage drive controller and said library controller; and a third communication link connecting said library controller and said accessor control card, wherein said third communication link comprises a wireless communication link;

transporting said portable data storage cartridge to said data storage drive; and communicating to said data storage drive said first data position information before delivering said portable data storage cartridge to said data storage drive.

8. The method of claim 7, wherein said memory device comprises non-volatile memory.

9. The method of claim 7, wherein said memory device comprises a semiconductor memory device.

10. The method of claim 7, wherein said data storage medium comprises a magnetic tape.

11. The method of claim 7, further comprising the steps of:

dispatching said one or more accessor to retrieve said portable data storage cartridge;

releaseably attaching said portable data storage cartridge to said gripper mechanism such that said memory device is disposed adjacent said memory reading device disposed on said one of said one or more accessor;

reading said first data position information using said memory reading device; and adjusting the position of said data storage medium with respect to a read/write head based upon said first data position information.

12. The method of claim 11, further comprising the step of reading data from said data storage medium.

13. The method of claim 11, further comprising the step of writing data to said data storage medium.

14. The method of claim 13, further comprising the steps of:

generating second data position information; and storing said second data position information in said memory device.

15. The method of claim 14, wherein said storing step further comprises the step of overwriting said first data position information with said second data position information.

16. An automated data storage and retrieval system comprising a computer useable medium having computer readable program code disposed therein to expedite data retrieval from a portable data storage cartridge disposed within an automated data storage and retrieval system, wherein said automated data storage and retrieval system comprises:

a portable data storage cartridge comprising a housing, a data storage medium disposed within said housing, a memory device disposed within said housing, and first data position information stored in said memory device;

a data storage drive comprising a read/write head and a data storage drive controller;

an accessor for retrieving and transporting said data storage cartridge, wherein said accessor comprises a gripper mechanism, a memory reading device, an accessor control card, and a wireless communication device;

a first communication link connecting said memory reading device and said accessor control card;

a second communication link connecting said data storage drive controller and said library controller; and a third communication link connecting said library controller and said accessor control card, wherein said third communication link comprises a wireless communication link;

said computer readable program code comprising a series of computer readable program steps to effect:

transporting said portable data storage cartridge to said data storage drive; and communicating to said data storage drive said first data position information before delivering said portable data storage cartridge to said data storage drive.

17. The automated data storage and retrieval system of claim 16, wherein said memory device comprises non-volatile memory.

18. The automated data storage and retrieval system of claim 16, wherein said memory device comprises a semiconductor memory device.

19. The automated data storage and retrieval system of claim 16, wherein said data storage medium comprises a magnetic tape.

20. The automated data storage and retrieval system of claim 16, said computer readable program code further comprising a series of computer readable program steps to effect;

dispatching accessor to retrieve said portable data storage cartridge;

releaseably attaching said portable data storage cartridge to said gripper mechanism such that said memory device is disposed adjacent said memory reading device disposed on said accessor;

reading said first data position information using said memory reading device; and adjusting the position of said data storage medium with respect to a read/write head based upon said first data position information.

21. The automated data storage and retrieval system of claim 20, wherein said computer readable program code further comprises a series of computer readable program steps to effect reading data from said data storage medium.

22. The automated data storage and retrieval system of claim 20, wherein said computer readable program code further comprises a series of computer readable program steps to effect writing data to said data storage medium.

23. The automated data storage and retrieval system of claim 22, wherein said computer readable program code further comprises a series of computer readable program steps to effect:

generating second data position information; and storing said second data position information in said memory device.

24. The automated data storage and retrieval system of claim 23, wherein said computer readable program code further comprises a series of computer readable program steps to effect overwriting said first data position information with said second data position information.

* * * * *